L. VON GUNTEN.
Lathe Chuck.
No. 60,292.
Patented Dec. 4, 1866.
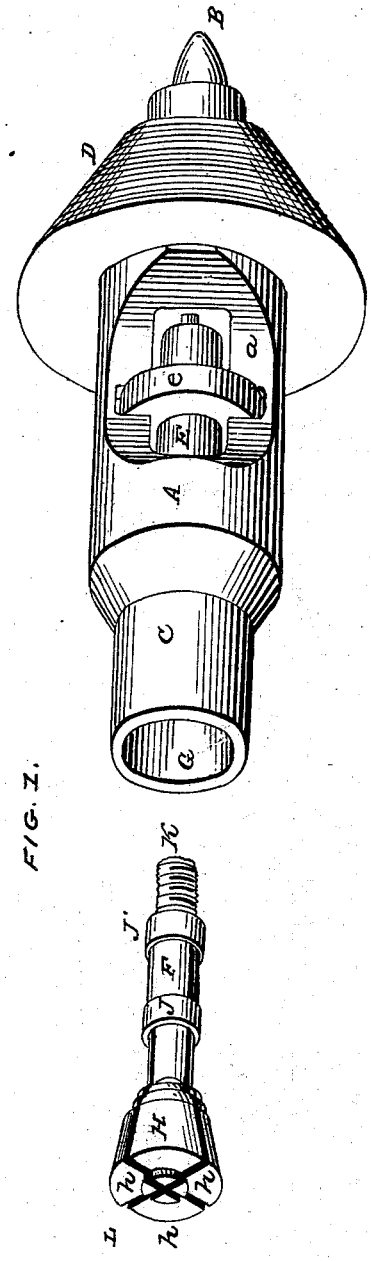
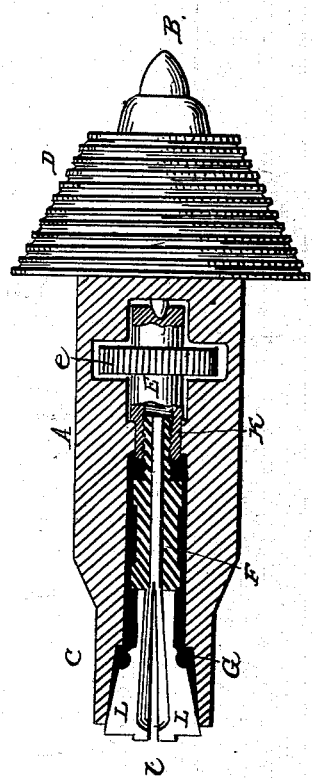
WITNESSES:
INVENTOR.

United States Patent Office.

IMPROVEMENT IN LATHE CHUCKS.

LOUIS VON GUNTEN, OF CINCINNATI, OHIO.

Letters Patent No. 60,292, dated December 4, 1855.

SPECIFICATION.

TO ALL WHOM IT MAY CONCERN:

Be it known that I, LOUIS VON GUNTEN, of Cincinnati, Hamilton county, Ohio, have invented a new and useful Watchmaker's Lathe Chuck; and I do hereby declare the following to be a full, clear, and exact description thereof, reference being had to the accompanying drawings, making part of this specification.

My invention relates to a form of lathe chuck adapted for accurately and firmly grasping watch pinions and arbors, and other minute objects.

Figure 1 is a perspective view of my chuck, with the mandrel detached.

Figure 2 is an axial section through the same.

The spindle A has the customary tail or point B and journal C. It is also provided with a suitable driving pulley, D, which may have the represented conical and stepped form, in order to obtain different speeds from the same belt. Journaled axially within the spindle A is a nut E, having a milled head $e$, to which access is afforded by scollops $a$ in the sides of the spindle. All that part of the spindle which includes and is in front of the nut is chambered out to receive and hold a mandrel, F, composed of spring steel. The extreme forward portion of this chamber consists of a flaring mouth G, to fit the flaring head H of the mandrel; and said mouth communicates rearward with a cylindrical chamber I, which fits and encloses corresponding collars J J' on the mandrel shank. The shank of the mandrel terminates in a screw K, which fits the nut E. The flaring head H of my mandrel has two narrow slits or kerfs, L, which divide the head into four precisely similar and diametrically opposite jaws $h$. In their normal or unrestrained condition, the jaws $h$ assume, of themselves, the gaping form shown in the drawing. A short distance in rear of their front end the jaws $h$ are chambered out, as shown in fig. 2, so as to receive within them, without injury, a pinion or other enlargement, when desired. The apexes of the jaws are scolloped out, so as to form, collectively, a cylindrical throat $l$. When it is desired to secure or chuck a piece of work, one end of it is inserted in the throat $l$, and the nut E being rotated, the two pairs of opposite jaws close simultaneously and equally upon the work, so as to hold the same firmly and accurately central. The collars J J' and cylindrical chamber I retain the mandrel to a strictly axial position, with every variety of adjustment. Several mandrels of diverse calibers of throats being provided, enables the chucking of either large or very minute objects.

I claim herein as new and of my invention—

The grasping jaws $h\ h\ h\ h$, formed upon a stem F, guided by collars J J', and operated by a nut E $e$ confined within the chambered spindle A, which is formed with scollops $a\ a$, to afford access to the milled-head $e$ of the nut, all constructed and combined, substantially as herein described, and for the purposes specified.

In testimony of which invention I hereunto set my hand.

LOUIS VON GUNTEN.

Witnesses:
GEO. H. KNIGHT,
JAMES H. LAYMAN.